United States Patent [19]

Auvray

[11] Patent Number: 4,891,647
[45] Date of Patent: Jan. 2, 1990

[54] METHOD AND A DEVICE FOR REDUCING THE POWER OF JAMMING SIGNALS RECEIVED BY THE SECONDARY LOBES OF A RANDOM FREQUENCY RADAR ANTENNA

[75] Inventor: Gérard Auvray, Paris, France
[73] Assignee: Thomson-CSF, Paris, France
[21] Appl. No.: 460,076
[22] Filed: Jan. 5, 1983

[30] Foreign Application Priority Data
Jan. 22, 1982 [FR] France .................. 82 01012

[51] Int. Cl.⁴ .................. H04K 3/00; G01S 7/36
[52] U.S. Cl. .................. 342/16; 342/17; 342/19; 342/379
[58] Field of Search .......... 343/18 E; 342/14, 16, 342/17, 18, 19, 379, 380, 381, 382, 383, 384

[56] References Cited

U.S. PATENT DOCUMENTS 4,044,359 8/1977 Applebaum et al. ......... 343/18 E X
4,358,766 11/1982 Mehron .................. 343/18 E Primary Examiner—T. H. Tubbesing
Assistant Examiner—John B. Sotomayor
Attorney, Agent, or Firm—Cushman, Darby & Cushman

[57] ABSTRACT

A method and a device for reducing the power of jamming signals received by the secondary lobes of the main antenna AP of a radar transmitting at a random frequency $f_E(n)$, with which is associated a number of secondary antennas AS1, ... ASN. The signals used for the calculation in circuit (10) of the weighting coefficients (W1 to WN) to be applied to obtain a signal resulting from the weighted linear combination of the secondary signals D1, ... DN to be subtracted from the signal Do in the main channel (VPD) relative to the transmission frequency $f_E(N+1)$ are those ($V_0, V_1, \ldots V_N$) processed in the main and secondary auxiliary channels (VPA, AsA1, ... ASAN) relative to the transmission frequency $f_E(n+1)$ of the next recurrence train during the period of radar reception of the recurrence train corresponding to the transmission frequency $f_E(n)$ for the jammed range slots selected by circuit (15).

20 Claims, 3 Drawing Sheets

METHOD AND A DEVICE FOR REDUCING THE POWER OF JAMMING SIGNALS RECEIVED BY THE SECONDARY LOBES OF A RANDOM FREQUENCY RADAR ANTENNA

BACKGROUND OF THE INVENTION

The present invention covers a method and a device for reducing the power of jamming signals received by the secondary lobes of a random frequency radar antenna.

In general, these signals are active, continuous or discontinuous jamming signals emitted by several independant jammers. They are received by the radar antenna secondary lobes and their level is such that they are considered as real signals coming from targets and they thus completely upset the radar operation.

In a fixed frequency radar, to guard against active jamming of this type, the countermeasure technique called SLC, 'side lobe cancellation', has been proposed. A schematic description of this can be found in an article by M. A. JOHNSON and D. C. STONER, 'ECCM from the radar designer's viewpoint', which appeared in the Microwave Journal in March 1978, pages 59 to 60.

For this technique, as well as the radar antenna and its corresponding processing channel, a number N of auxiliary antennas associated with N reception channels are used. A weighted linear combination of the N complex signals delivered by the N auxiliary channels is made and this is subtracted from the main channel signal, the weighting coefficients being determined from signals received by the auxiliary channels and the main channel in order to reduce the resulting jamming power in the main channel.

However, the effectiveness of the process as given above, which can be applied to a random frequency radar, appears to be based on the determination of the relative gains of the jamming signals in each of the auxiliary channels with respect to the gain of the main channel. Under these conditions it is then found that any signal other than the jamming signals properly speaking, i.e. thermal noise, clutter, useful echoes, must be considered as a jamming signal upsetting the exact determination of the weighting coefficients and, because of this, interfering with the quality of the jamming elimination. As a result, in devices made under previous practice, the measurement of the weighting coefficients is so made that no account is taken of the existence, in the range sections or range slots divided up in the radar repetition periods, of the effective presence of jamming on the one hand and of that of the jamming signals which have been defined on the other. Hence, the weighting coefficients are computed in a not very precise fashion.

The first way to combat jamming consists in using random frequency signal transmission, the change in frequency taking place at the rhythm of $1/\Delta t$ which is such that the length of fixed frequency recurrence trains is at the most equal to the stationariness of the gains corresponding to the jamming signals received.

SUMMARY OF THE INVENTION

The purpose of the present invention is to define, for a random frequency transmission radar, a method and a device for reducing the power of active jamming signals which depend on the technique of side lobe cancellation in which the disadvantages mentioned are corrected.

In accordance with the invention, the method for reducing the power of the jamming signals received by the secondary lobes of the main antenna of a radar of random frequency $f_E(n)$, antenna with which are associated a number N of secondary antennas and the corresponding main and secondary processing channels, in accordance with which, when the length $\Delta t$ of the recurrence trains at fixed frequency $f_E(n)$ is at the most equal to the stationariness of the gains corresponding to the jamming signals received, a weighted linear combination is made of the complex signals formed by the echoes of the various range slots and delivered by the main and secondary processing channels, when the weighting coefficients are determined in such a way as to reduce the resulting jamming power, is characterized by the fact that the weighting coefficients related to the transmission frequency $f_E(n+1)$ of the next recurrence train are computed from the signals received by the main and secondary antennas and processed at the said transmission frequency $f_E(n+1)$ during the reception period for the radar signals at the transmission frequency $f_E(n)$ of the preceding recurrence train.

BRIEF DESCRIPTION OF THE DRAWINGS

Other characteristics and advantages of the invention will appear from the description of the method and device applying it, which is given as a non-limiting example, with reference to the figures attached which show.

DETAILED DESCRIPTION OF THE PREFERRED EMBODIMENT

Figure 1:
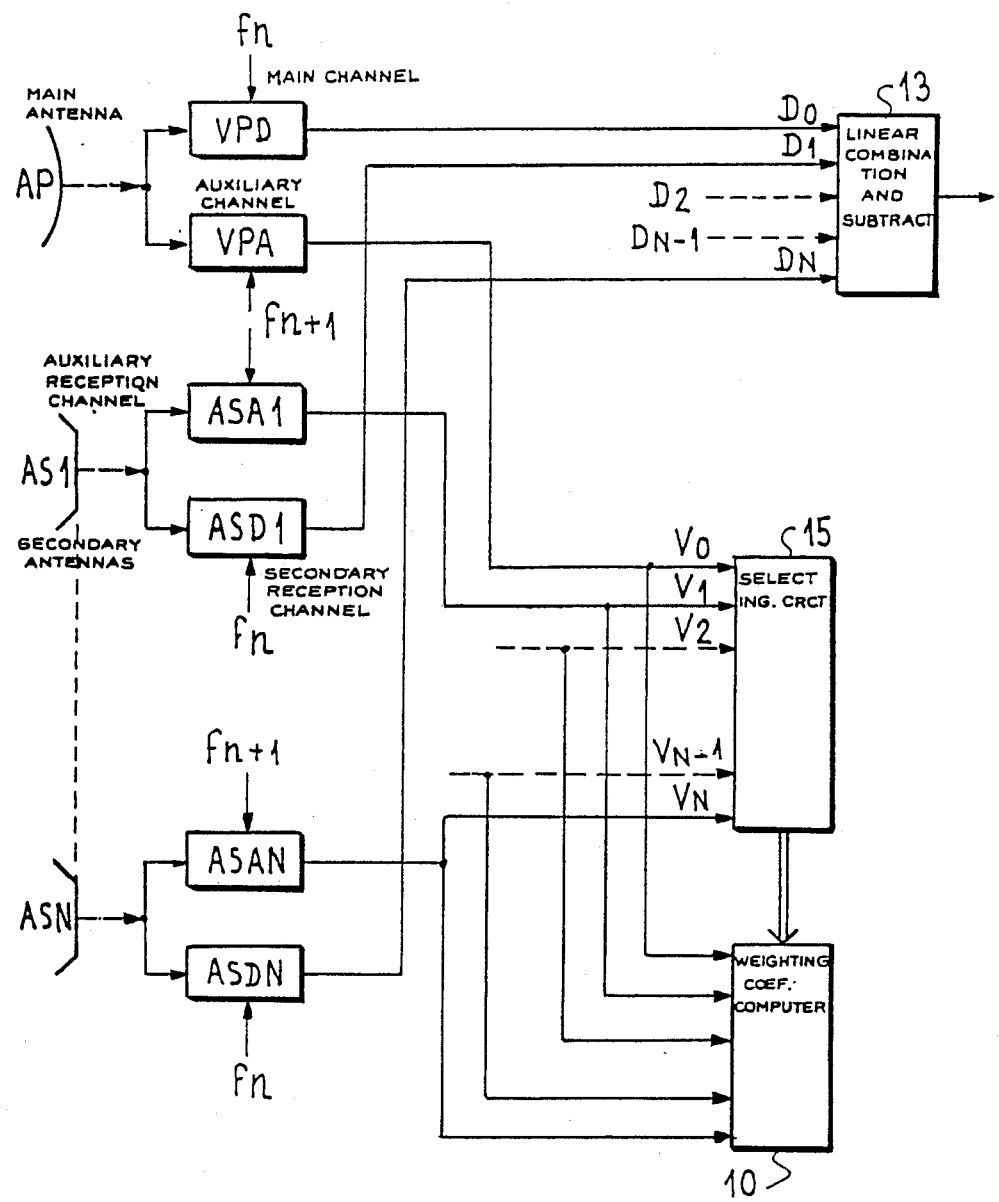
in FIG. 1, the schematic diagram of a device in accordance with the invention, in FIG. 2, a detailed way of producing part of the device in accordance with the invention.

The theory of the device in accordance with the invention is described below with reference to FIG. 1.

It is assumed that the radar is a random frequency one. The radar has a main antenna AP and N secondary antennas AS1 to ASN. With the main and each secondary antenna, AP, AS1, . . . ASN, a direct processing channel for the signals received is associated, which is indicated in FIG. 1 by VPD and ASD1 to ASDN respectively.

It is found that, in the method of active jamming reduction using the SLC technique (side lobe cancellation), the calculation of the weighting coefficients to be used to produce the linear combination of the signals coming from the N secondary channels, for the subsequent purpose of subtracting the resultant signal from the signal received in the main channel, is not very precise, because the measurement is upset by the existence of interference signals other than the active jamming signals whose power is to be reduced. In this case, these interference signals are the thermal noise, the clutter and the useful signals which, in this case, can be considered as interfering, mainly high power useful echoes at the start of a recurrence, i.e. at a short distance from the radar.

In accordance with the invention, in the weighting coefficient calculation, it is desired to eliminate the influence of the interference signals, also called parasites, to obtain more precisely determined coefficients, which will give increased precision to the final phase of the method used and enable a useful signal to be obtained in which the jamming will be greatly reduced if not eliminated.

In the rest of the description, the radar transmission frequency is designated by $f_E(n)$ after the $(n-1)^{th}$ frequency change, this frequency being considered as fixed during the time $\Delta t$. The local oscillator frequency is designated by $f_n$ which, on reception, converts the signals received corresponding to the transmission frequency $f_E(n)$ to the intermediate frequency.

These weighting coefficients are calculated with respect to the transmission frequency $f_E(n+1)$ corresponding to the next recurrence train. The solution proposed consists in placing channels, called auxiliary reception channels VPA, ASA1, ... ASAN respectively, which work on the future transmission frequency $f_E(n+1)$, in parallel with the main reception channel VPD for the signal received by the main antenna AP and with each of the N secondary reception channels ASD1, ... ASDN (corresponding to the secondary antennas AS1, ... ASN), which are working on the present transmission frequency $f_E(n)$. Under these conditions, the parasite signals corresponding to the various radar echoes, returned by the target(s), the ground and clouds for example, cannot be received since they are at the frequency $f_E(n)$, which is different by definition from $f_E(n+1)$. No filter to eliminate fixed or low speed echoes is required. The weighting coefficients are computed from the signals received by the auxiliary channels, which, as a result, are jamming signals other than clutter and useful signals.

The signals received by the auxiliary channels VPA, ASA1, ... ASAN are also subjected, in a circuit 15, to a processing which consists in determining the range slots (or range sections) defined in each recurrence which are really jammed by the main antenna secondary lobes. This is done by comparing, for each range slot, the received signal strength in the main channel VPA with the received signal strengths received in the various auxiliary channels ASA1 to ASAN respectively. A slot is then considered as jammed by the main antenna secondary lobes if the power of the corresponding signal received in an auxiliary channel, ASA1, ... ASAN, is greater than the power of the corresponding signal received in the main auxiliary channel VPA.

The data slots which are thus determined as jammed are validated to allow for the thermal noise, the validation consisting in comparing the data level in the jammed slot with a threshold which is determined as a function of the thermal noise level.

When they have been validated, the jammed data slots are selected for the calculation of the weighting coefficients Wi, i=1, ..., N which is done in circuit 10.

The weighting coefficients, which have thus been computed more precisely than in prior practice, are used to produce the linear combination of the signals coming from the direct secondary channels, ASD1, ... ASDN, after they have been recorded in order to delay by the frequency change their application to the circuit making the linear combination. The signal resulting from the linear combination is then subtracted from the signal supplied by the direct channel VPD to the main channel in order to produce a useful signal in which the jamming power is much reduced if not eliminated. The linear combination and its subtraction from the direct main channel signal are done in circuit 13 whose output signal is processed by the conventional reception circuit of the radar, which is not shown in the figure.

Figure 2:
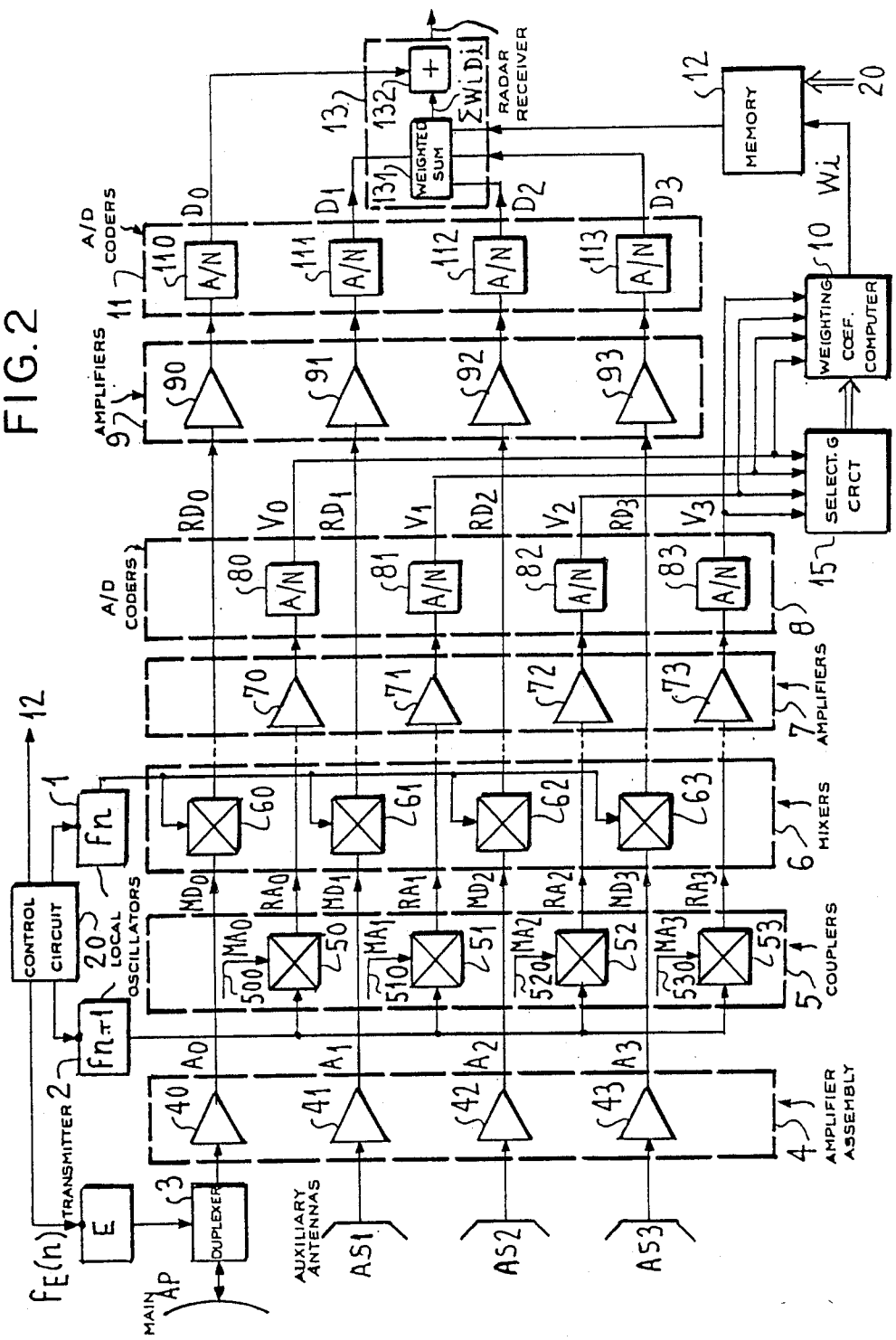

A detailed way of producing part of the schematic in FIG. 1 is shown in FIG. 2.

As a non-limiting example and in order not to complicate the figure too much, only 3 secondary antennas, AS1, AS2 and AS3, (N=3) are shown, each of them being associated with a channel for direct processing of the signals received and an auxiliary channel.

The main channel contains a duplexer 3 switched to a transmitter E whose transmission frequency $f_E(n)$ is controlled by a control circuit 20, which is also able to control the frequency $f_n$ of a first local oscillator 1 with high phase stability and the frequency $f_{n+1}$ of a second local oscillator 2, frequency $f_{n+1}$ corresponding to the transmission frequency $f_E(n+1)$ of the next recurrence train, which control circuit 20 is able to determine in advance. Second oscillator 2 does not need to have the high phase stability characteristics of a classical oscillator such as the one used for first local oscillator 1. The device in accordance with the invention contains a first amplifier assembly 4, which consists of an amplifier 40 fed by the output signal of duplexer 3 and, for each of the three secondary channels, an amplifier, 41, 42 and 43 respectively, which are fed by the signal received by the secondary antenna, AS1, AS2 and AS3 respectively. The main channel and each of the secondary channels (which are fed by the signals received by antennas, AP, AS1, AS2, and AS3 respectively) consists of two parallel processing channels which are fed, for the first channel called the direct one, by a signal $MD_0$, $MD_1$, $MD_2$ and $MD_3$ at the output of amplifier 40, 41, 42 and 43 respectively, and for the second or auxiliary channel by a signal $MA_0$, $MA_1$, $MA_2$ and $MA_3$ picked up by a coupler 500, 510, 520 and 530 at the output of amplifier 40, 41, 42 and 43 respectively.

The direct and auxiliary channels respectively of the main and secondary antennas consists of a first mixer, 6 and 5 respectively, which makes possible the conversion to the first intermediate frequency, a conventional assembly (not shown) of mixers and amplifiers at other intermediate frequencies, a video amplifier, 9 and 7 respectively, and an analogue/digital coding circuit 11 and 8 respectively. The mixer circuits, 60, 61, 62 and 63 of the direct channel of the main and secondary channels, regrouped in sub-assembly 6, are fed, as already stated, by the amplified signal received, $MD_0$, $MD_1$, $MD_2$ and $MD_3$ respectively, and also receive the signal supplied by local oscillator 1 at transmission frequency $f_n$. The video signal received, $RD_0$, $RD_1$, $RD_2$ and $R_3$ respectively, is applied to the input of an analogue/digital coding circuit, 110, 111, 112 and 113 respectively (which form the first coding sub-assembly 11), through an amplifier 90, 91, 92 and 93 respectively (which form the amplifier sub-assembly 9).

The coded signals, at the output of the direct channel, are designated $D_0$, $D_1$, $D_2$ and $D_3$ respectively for the main and secondary channels.

In the same way, the mixer circuits, 50, 51, 52 and 53, fed by signals $MA_0$, $MA_1$, $MA_2$ and $MA_3$ picked up by couplers 500, 510, 520 and 530 respectively, with which they form sub-assembly 5, receive at their second input the signal supplied by the second local oscillator 2 at frequency $f_{n+1}$.

The video signal, $RA_0$, $RA_1$ $RA_2$ and $RA_3$, at the output of the assembly of mixer circuits and amplifiers at various intermediate frequencies (not shown) is applied to the input of an analogue/digital coding circuit, 80, 81, 82 and 83 respectively (which form the second coding sub-assembly 8) through a video amplifier, 70, 71, 72 and 73 respectively (amplifiers 70, 71, 72 and 73 form the second amplifier sub-assembly 7).

The coded output signals, designated $V_0$, $V_1$, $V_2$ and $V_3$ respectively for the auxiliary channel of the main and secondary antennas, are applied both to the input of a sample selecting circuit 15 and the input of circuit 10, which computes coefficients Wi and is controlled by selection circuit 15.

Coefficients Wi, where i=1 to N (here N=3), correspond to the transmission frequency anticipated $f_E$ (n+1), as has already been mentioned. Once calculated, they are stored in a memory 12 until the train of recurrences corresponding to transmission frequency $f_E$ (n+1) is formulated. Memory 12 may be, for example, a two stage register, and may delay by a frequency change the application of the weighting coefficients $W_1$, $W_2$ and $W_3$ to circuit 131, which is itself fed elsewhere by signals $D_1$, $D_2$ and $D_3$ from the output of the direct channel of the secondary channels. Circuit 131 computes the weighted sum, $$\sum_{i=1}^{N=3} W_i D_i + W_2 D_2 + W_3 D_3,$$

which is then applied to the negative input of an adder circuit 132 whose second, positive, input receives the coded signal Do from the output of the direct channel of the main channel.

Figure 3:
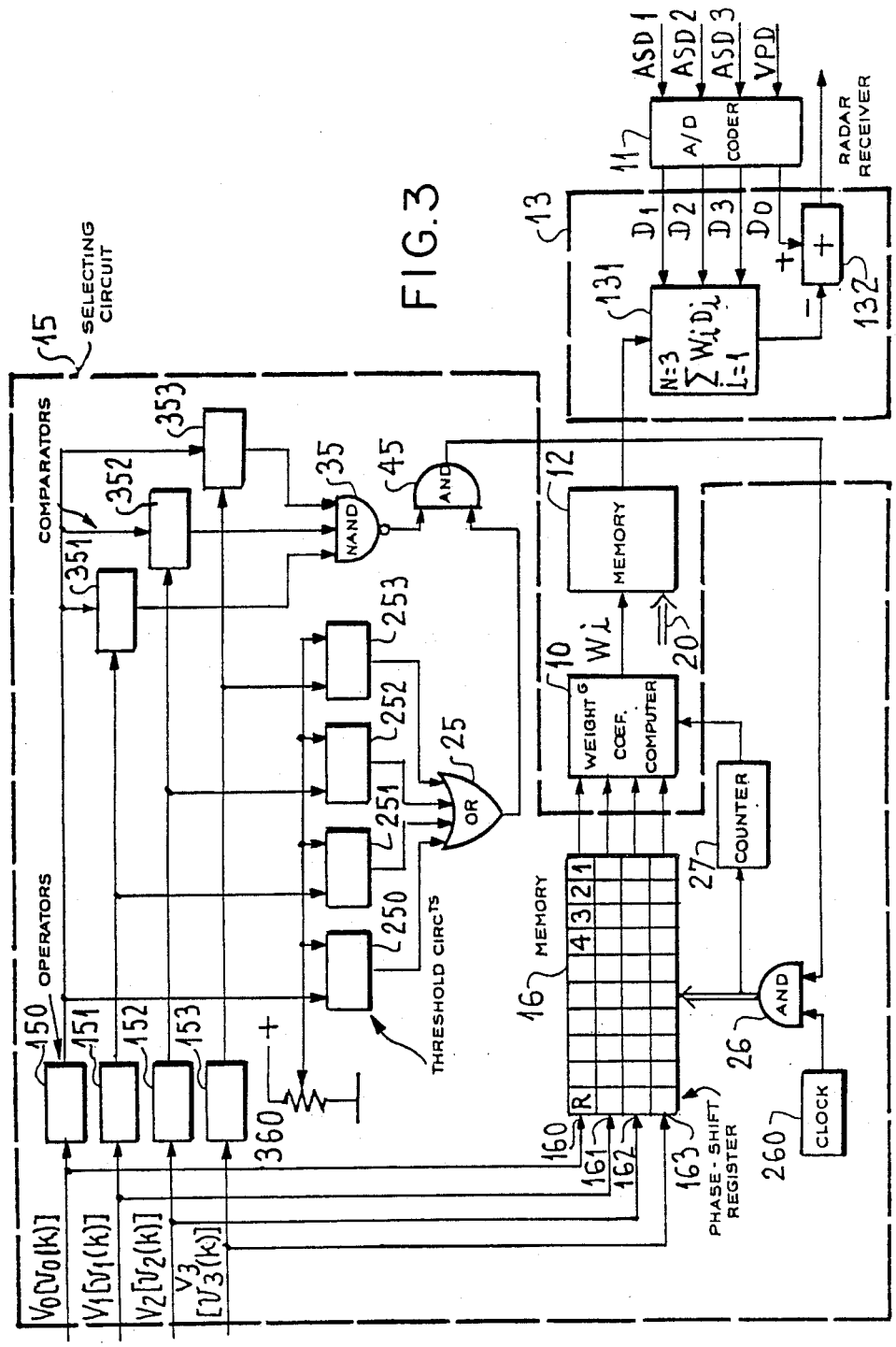
in FIG. 3, a detailed way of producing the circuit selecting the jammed range slots which are used for the calculation of the weighting coefficients.

A detailed way of producing circuit 15 is shown in FIG 3 as an example.

The circuits which form sub-assembly 15 are known in themselves and are not described in detail in the present application.

Operators, 150, 151, 152 and 153, which receive output signals $V_0$, $V_1$, $V_2$ and $V_3$ respectively from coding circuits 80, 81, 82 and 83, determine the modules, $M_0$, $M_1$, $M_2$ and $M_3$ respectively, which are used to detect the presence of the jamming receiving by the secondary lobes of the main antenna. This detection is done by sub-assembly 15 which determines the range slots jammed, which are also called range sections or samples, by comparing the module $M_0$ of the main signal with the module, $M_1$, $M_2$ or $M_3$ of the secondary signals in comparator circuits, 351, 352 and 353 respectively, whose outputs are applied to the input of a NAND gate 35. The comparators operate in positive logic as follows:

Output level=1 logic if Mi≦Mo when i=1, 2 or 3
Output level=0 logic if Mi>Mo when i=1, 2 or 3

The 0 logic state at the output corresponds to the presence of jamming for the couple, main channel/secondary channel i, in the case considered.

Threshold circuits, 250, 251, 252 and 253 respectively, receive on their first input the module, $M_0$, $M_1$, $M_2$ and $M_3$ respectively, and on their second input a threshold value, which is a function of the thermal noise level and is determined by resistor Ro 360. An OR gate, 25, is fed by the output signal of threshold circuits, 250, 251, 252 and 253, whose output logic level (positive logic) is equal to: 1 logic if Mi≧Ro and 0 logic if Mi<Ro when i=0, 1, 2 or 3.

The output signal of threshold circuits 250, 251, 252 and 253 is applied to the input of OR gate 25 whose output is connected to the first input of AND gate 45.

The second input of AND gate 45 is fed by the output of NAND gate 35 and its output delivers the jammed slot data which were validated by threshold circuits 250, 251, 252 and 253.

These data are applied to the first input of AND gate 26 whose second input receives the clock signal delivered by circuit 260 and supplying the range slot data. The output of AND gate 26 is connected to the input of a counter 27 and also controls memory circuit 16. Memory circuit 16 consists of four shift register assemblies, 160, 161, 162 and 163, in the method of production of FIGS. 2 and 3 in which N=3. They contain a certain number of elements R which correspond to the optimum number of jammed slots to be considered in the calculation of the weighting coefficients. This number provides a certain selection. The registers are fed by the date delivered by the main and secondary channels, $V_0$, $V_1$, $V_2$ and $V_3$, the data from the $k^{th}$ order range slot being designated by $v_0(k)$, $v_1(k)$, $v_2(k)$ and $v_3(k)$ for the main and secondary channels respectively.

Memory assembly 16 operates in accordance with the shift register principle but with the particularity that it is filled by output elements and only certain data are recorded, those corresponding to the slots really jammed. The recording of the data is then under the control of the data indicating the slots jammed which is delivered by AND gate 45 through AND gate 26.

Thus it is clear that memory 16 cannot record a quantity of jammed slot data greater than R. In the case in which the number of jammed slot data is bigger than this number R, the memory only records the last R. The calculation of the weighting coefficients Wi is made, from the R samples thus chosen, in circuit 10 to which is connected memory circuit 16.

In the case in which the number of jammed slots, R' for example, is less than the optimum number of slots which can be recorded, the calculation of the weighting coefficients is made with these R' samples, these data being passed to computing device 10 by counter 27. Counter 27 counts the number of range slots recorded in memory 16 and at the end of the recurrence passes this number to computing device 10.

The coefficients Wi, in which i=1 to N=3, are recorded in circuit 12 in order to delay by a frequency change their application to circuit 131 which makes the linear combination $$\sum_{i=1}^{N=3} W_i D_i$$

in which the signals Di of the direct secondary channels are supplied by coding circuit 11 in FIG. 2. The application of coefficient Wi stored in memory 12 to weighted summing circuit 131 can be controlled by circuit 20 in FIG. 2 which also controls the frequency changes of local oscillators 1 and 2 in this figure. The weighted sum $$\sum_{i=1}^{N=3} W_i D_i$$

is then applied to the negative input of a summing circuit 132 which receives at its positive input the coded signal $D_0$ from the direct main channel VPD which is supplied by circuit 110 in sub-assembly 11.

The difference $$D_0 - \sum_{i=1}^{N=3} W_i D_i$$

is then processed by the conventional radar receiver known to professionals.

Circuit 10, which computes coefficients $W_i$, is generally a programmable operator which can use the computing method described below that is based on the algorithm of Widrow.

Let $v_0(k)$, $v_1(k)$, $v_2(k)$ and $v_3(k)$ be the complex signals coming from the main and secondary auxiliary channels corresponding to be $k^{th}$ order jammed sample selected.

The covariance functions $Y_{ij}$ of the secondary signals between themselves are computed. $Y_{ij} = \Sigma_k v_i(k) v_j^*(k)$ in which $i \leq j \leq N = 3$ while $Y_{ji} = Y_{ij}^*$.

It is to be remembered that, in a known way, the sign* designates the conjugate number of the value it affects.

Also, the intercorrelation functions $C_i$ between the main and auxiliary signals are computed: $C_i = \Sigma_k v_0(k)$, $v_1^*(k)$, $i = 1 \ldots N = 3$.

The following nine quantities are then obtained: $Y_{11}$, $Y_{22}$, $Y_{33}$, $Y_{12}$, $Y_{13}$, $Y_{23}$, $C_1$, $C_2$ and $C_3$.

The following quantities are determined:

$$\begin{aligned}
m_{11} &= Y_{22} Y_{33} - |Y_{23}|^2 \\
m_{22} &= Y_{11} Y_{33} - |Y_{13}|^2 \\
m_{33} &= Y_{11} Y_{22} - |Y_{12}|^2 \\
m_{21} &= Y_{13}^* Y_{23} - Y_{12}^* Y_{33} \\
m_{31} &= Y_{12}^* Y_{23} - Y_{13}^* Y_{22} \\
m_{32} &= Y_{13}^* Y_{12} - Y_{11} Y_{23}^*
\end{aligned}$$

and then the expression $\Delta = m_{11} Y_{11} - m_{21} Y_{12} + m_{31} Y_{13}$ The following coefficients are computed:

$$n_{11} = \frac{m_{11}}{\Delta} \quad n_{22} = \frac{m_{22}}{\Delta} \quad n_{33} = \frac{m_{33}}{\Delta} \quad n_{21} = \frac{m_{21}}{\Delta}$$

$$n_{31} = \frac{m_{31}}{\Delta} \quad n_{31} = \frac{m_{32}}{\Delta}$$

and the required weighting coefficients are finally obtained:

$$\begin{aligned}
W_1 &= n_{11} C_1 + n_{21} C_2 + n_{31} C_3 \\
W_2 &= n_{21}^* C_1 + n_{22} C_2 + n_{32} C_3 \\
W_3 &= n_{31}^* C_1 + n_{32}^* C_2 + n_{33} C_3
\end{aligned}$$

It may be noted that the number of samples with which the covariance and intercorrelation functions were computed is a variable parameter which can be adapted as a function of the search for a compromise between the reduction of the jamming and the simplicity of the operations.

The device in accordance with the invention, such as it is described in the present application, has the big advantage of using, for the processing at the anticipated transmission frequency, a second local oscillator which does not have to have the high phase stability of the local oscillator used for the reception of the radar signals corresponding to the true transmission frequency. Also, no fixed echo processing is required.

A method and a device for reducing the power of jamming signals received by the secondary lobes of a random frequency radar antenna have thus been described.

What is claimed is:

1. A method for reducing the power of jamming signals received by the secondary lobes of a main antenna of a radar at the random frequency $f_e(n)$, said radar including a plurality N of secondary antennas and main and secondary processing channels for each of said main and secondary antennas, said method in which, when the length $\Delta t$ of the recurrence trains at the fixed frequency $f_E(n)$ is at the most equal to the stationariness of the jamming signals received, a weighted linear combination is made of the complex signals formed by the various range slots, which are delivered by the main and secondary processing channels, the weighting coefficients being so determined as to reduce the resulting jamming power, and the weighting coefficients relating to the transmission frequency $f_E(n+1)$ of the next recurrence train are calculated from signals received by the main and secondary antenna secondary channels and processed at the said transmission frequency $f_E(n+1)$ during the period of reception of the radar signals at the transmission frequency $f_E(n)$ of the preceding recurrence train so as to eliminate parasitic interference signals in the calculation of the weighting coefficients.

2. A method as in claim 1 wherein the weighting coefficients are only calculated from the jammed range slot echoes for which the signal received in the main channel is bigger than the one received in the secondary channels and validated with respect to the thermal noise.

3. A method as in claim 1 wherein it is applied to each fixed frequency recurrence train.

4. A random frequency radar antenna using the method in claim 1 comprising
   a main antenna having direct and secondary processing channels;
   N secondary antennas having corresponding direct and secondary processing channels, these secondary antennas being subjected to the high power jamming signals received by the secondary lobes of the main antenna;
   means for subtracting a signal resulting from a weighted linear combination of signals ($D_1$ to $D_N$) coming from the secondary processing channels, from a signal $D_0$ coming from the main processing channels;
   control circuit means for determining a transmission frequency $f_E(n)$, and for predetermining the transmission frequency $f_E(n+1)$ of the next recurrence train, and for controlling local oscillator frequencies $f_n$ and $f_{n+1}$ corresponding to the transmission frequencies, making possible the reception of the radar signals at $f_E(n)$ and the anticipated frequency $f_E(n+1)$;
   said direct channels processing at local oscillator frequency $f_n$, while said secondary channels are processing signals received at the local oscillator frequency $f_{n+1}$ and delivering $V_0$, $V_1$ to $V_N$, corresponding thereto;
   a circuit which is fed by the signals, $V_0$, $V_1$ to $V_N$, from the output of said auxiliary channels, for selecting range slots which are effectively jammed;

a first computing circuit which receives the said signals, $V_0$, $V_1$ to $V_N$, at an output of the secondary channels and computes, for the range slots selected, weighting coefficients, $W_1$ to $W_N$; and a second computing circuit, computing the useful signal which is $D_0 - \epsilon_{i=1}^N W_i D_i$, in which $D_0$ and $D_1$ to $D_N$ are the signals delivered by the direct processing channels and contain a low jamming power.

5. A device as in claim 4 in which the signal received by the main and secondary antennas is amplified in a first amplifier sub-assembly before being applied to the input of the direct and auxiliary channels associated with each antenna through a coupler.

6. A device as claimed in claim 4 wherein each direct and auxiliary channel comprise:
a mixer fed by the channel input signal and the frequency conversion signal, $f_n$ or $f_{n+1}$, supplied by the first or second local oscillator,
a set of amplifiers and mixers at various intermediate frequencies,
a video amplifier,
an analogue/digital coding circuit delivering the coded signal, $D_0$, $D_1$ to $D_N$ or $V_0$, $V_1$ to $V_N$.

7. A device as claimed in claim 4, further comprising a memory circuit which stores the weighting coefficients ($W_1$ to $W_N$) calculated by said first computing circuit up to the change of the transmission frequency $f_E(n)$ to $f_E(n+1)$ which is predetermined by a control circuit.

8. A device as claimed in claim 4 wherein the circuit for detecting and selecting the jammed range slots among the range slots determined by a clock circuit comprises:
a third set of computing circuits computing the module ($M_0$, $M_1$ to $M_N$) of the output signal ($V_0$, $V_1$ to $V_N$) of the main and secondary auxiliary processing channels,
a first set of comparator circuits which are fed at their first input by the output signal module ($M_1$ to $M_N$) of each auxiliary secondary channel, the module being supplied by said third computing circuit assembly and at their second input by the output signal module $M_0$ of the auxiliary main channel, these comparator circuits determining the jammed range slots for which the first input is larger than the second input,
a second set of comparator circuits which compare the output signal module ($M_0$, $M_1$ to $M_N$) of each main and secondary auxiliary channel computed by said third set of computing circuits with a threshold corresponding to the thermal noise,
a set of logic circuits delivering the jammed slots data validated with respect to the thermal noise threshold.

9. A device as claimed in claim 8 wherein the threshold which validates the jammed range slot data with respect to the thermal noise is fixed by a resistor.

10. A device as claimed in claim 8 wherein said circuit for detecting and selecting the jammed range slots further comprises:
a second memory circuit formed by (N+1) shift registers with R elements which are intended to store the digital output signal ($V_0$, $V_1$ to $V_N$) of each auxiliary channel, the recording being controlled by an AND gate fed by a clock which supplies the range slot data and by the jammed range slot data supplied by said set of logic circuits.

11. A device as claimed in claim 10 wherein the number R of elements (N+1) in said shift registers of the second memory circuit corresponds to the optimum number of possible jammed slots, a counter indicating the number of jammed slot data to be used by said first computing circuit computing the weighting coefficients.

12. A device as claimed in claim 4 wherein said first computing circuit computing the weighting coefficients uses the Widrow algorithm.

13. A device as claimed in claim 4 wherein said first computing circuit is a programmable operator.

14. A device as claimed in claim 4 wherein said second computing circuit comprises, connected in series:
a first sub-assembly which receives from the first computing circuit the weighting coefficients, $W_1$ to $W_N$, and the signals, $D_1$ to $D_N$, from the direct secondary channels, and delivers the weighted sum $$\sum_{i=1}^{N} W_i D_i,$$

an adder circuit which receives at its first positive input the signal $D_0$ from the output of the direct main channel and at its second negative input the weighted sum $$\sum_{i=1}^{N} W_i D_i$$

calculated by the first computing sub-assembly.

15. A radar installation containing a device for reducing the power of jamming signals received by the secondary lobes of the antenna as in claim 4 and operating as in the method of claims 1 to 3.

16. Apparatus for effectively reducing jamming signals in a frequency agile radar having a main antenna and a plurality $N_f$ auxiliary antennas, comprising:
first local oscillator means for providing a first transmission signal with a frequency $f_E(n)$;
second local oscillator means for providing a second transmission signal with a frequency $f_E(n+1)$;
main antenna main channel means for receiving a first received signal at frequency $f_E(n)$ from said main antenna, said first received signal corresponding to said first transmission signal and including parasitic signals at said frequency $f_E(n)$;
main antenna secondary channel means for receiving a second received signal at frequency $f_{E(n+1)}$ from said main antenna, said second received signal including jamming signals at said frequency $f_{E(n+1)}$;
a plurality N of auxiliary antenna main channel means for receiving said first received signal from said plurality N of auxiliary antennas, respectively;
a plurality N of auxiliary antenna secondary channel means for receiving said second received signal from said plurality N of auxiliary antennas, respectively;
a plurality N of auxiliary antenna secondary channel means for receiving said second received signal from said plurality N of auxiliary antennas, respectively;
weighting coefficient processing means, coupled to each of said main antenna and auxiliary antenna secondary channel means, for calculating a plurality of weighting coefficients related to said frequency $f_E(n+1)$, said weighting coefficients being substantially unrelated to said parasitic signals; and linear combination and subtraction means, coupled to said weighting coefficient processing means and to each of said main antenna and secondary antenna main channel means, for producing a linear combination of signals from said plurality N of auxiliary antenna main channel means and said weighting coefficients, and for subtracting said linear combination signal from a signal supplied from said main antenna main channel means during a next recurrence having a transmission frequency $f_E(n+1)$ to cause jamming signals received during said next recurrence to be substantially reduced.

17. Apparatus according to claim 16 further including control means for controlling said first and second local oscillator means.

18. Apparatus according to claim 16 further including means for validating said weighting coefficient with respect to thermal noise.

19. A method for effectively reducing jamming signals in a frequency agile radar having a main antenna with a main channel and a secondary channel, said radar also including a plurality N of auxiliary antennas, each auxiliary antenna having a corresponding main and secondary channel, comprising the steps of:

providing a first transmission signal having a frequency $f_E(n)$;

providing a second transmission signal having a frequency $f_E(n+1)$;

receiving, on said main antenna and auxiliary antenna main channels, a first received signal having a frequency $f_E(n)$, said first received signal corresponding to said first transmission signal and including parasitic signals at said frequency $f_E(n)$;

receiving, on said main antenna and auxiliary antenna secondary channels, a second received signal at said frequency $f_E(n+1)$, said second received signal including jamming signals at said frequency $f_E(n+1)$;

calculating a plurality of weighting coefficients from the second received signals supplied by said main antenna and auxiliary antenna secondary channels, said weighting coefficients being related to said frequency $f_E(n+1)$ and substantially unrelated to said parasitic signals;

calculating a linear combination of signals from the plurality N of auxiliary antenna main channel means and said weighting coefficients; and subtracting said linear combination signal from a signal supplied from said main antenna main channel during a next recurrence having a transmission frequency $f_E(n+1)$ to cause jamming signals received during said next recurrence to be substantially reduced.

20. A method according to claim 19 further including the step of validating the weighting coefficients with respect to thermal noise.

* * * * *